3,733,411
ANTIINFLAMMATORY METHODS
William Rodney Roderick, Libertyville, Ill., assignor to Abbott Laboratories, North Chicago, Ill.
No Drawing. Filed June 9, 1971, Ser. No. 151,483
Int. Cl. A61k 27/00
U.S. Cl. 424—263     3 Claims

ABSTRACT OF THE DISCLOSURE 2,3 - dihydro - 1H - pyridino-[2,3-b][1,4]-thiazin-2-one 4-oxide has been found to possess excellent antiinflammatory, analgesic and antipyretic activity when administered in small doses to warm-blooded animals.

DETAILED DESCRIPTION OF THE INVENTION

The present invention is directed to 2,3-dihydro-1H-pyridino-[2,3-b][1,4]-thiazin-2-one 4-oxide and its antiinflammatory, analgesic and antipyretic activity. The new compound shows no toxic manifestations at oral doses of 1000 mg./kg. in mice and even the intraperitoneal $LD_{50}$ in mice is well above 1000 mg./kg. The free base shows an oral $ED_{25}$ of 35 mg./kg. in rats as antiinflammatory, an oral $ED_{50}$ of 90 mg./kg. as antipyretic in rats and an oral $ED_{50}$ of 45 mg./kg. as an analgesic in mice. For lower animals, a dose of 25–100 mg./kg. produces excellent antiinflammatory, analgesic and antipyretic effects while in higher animals, a dose of 2.5–20 mg./kg. is recommended.

In a simple, general embodiment, the new compound is made by oxidizing 2,3-dihydro-1H-pyridino-[2,3-b][1,4]-thiazin-2-one (described in U.S. 3,546,220) with an equimolar amount of a peroxide, preferably a haloperbenzoic acid such as m-chloroperbenzoic acid in a suitable organic solvent, for example, chloroform.

In order to illustrate the method for preparing the above compound, reference is made to the following example which, however, is not meant to reduce the scope of the invention in any fashion.

EXAMPLE

A solution of 4.99 g. of 2,3-dihydro-1H-pyridino-[2,3-b][1,4]-thiazin-2-one in 1200 ml. of chloroform was placed in a 3-liter 3-neck flask equipped with stirrer, thermometer and dropping funnel. A solution of 6.13 g. of 85% m-chloroperbenzoic acid in 150 ml. of chloroform was added dropwise over a period of 45 minutes. The mixture was filtered and allowed to stand at room temperature. The slowly forming colorless crystals were collected and a further crop was obtained after cooling the solution in ice overnight. The crystals decomposed at 170° C. without prior melting; they were obtained in a yield of 70% of theory. The analytical values confirmed the crystals to be 2,3-dihydro-1H-pyridino-[2,3-b][1,4]-thiazin-2-one 4-oxide. The new compound is stable in solid form as the free base but decomposes slowly in aqueous solution upon extended storage.

The antiinflammatory effect of the compound was established by the following procedure: edema is produced in the paws of rats by the injection of carrageenan according to the method described in Winter et al. (Proc. Soc. Exp. Biol. Med., 1962, vol. 111, page 544). The above compound was administered orally at dosages (6 rats per dosage) of 10, 25 and 50 mg./kg. thirty minutes prior to the administration of the carrageenan. Edema is expressed as percentage increase over normal paw size and edema inhibition is calculated from the difference between the average edema size of a control group and the average edema size of the test group. The above dosages show edema inhibition of 3%, 10% and 41%, respectively. The oral $ED_{25}$ (i.e., the dose required to produce 25% reduction in edema size) was determined from a dosage/effect curve drawn on logarithmic graph paper and was established to be 35 mg./kg.

The antipyretic activity of the above compound was established in the following manner: fever was produced in rats by intramuscular injection of an aqueous suspension of brewer's yeast. After fever was stabilized, the test compound was administered orally and rectal temperatures were taken one, two and three hours after drug administration. The three hour reading was used to calculate fever percentage reduction between the test group and the control group of animals, each group comprising 4 to 6 animals. With doses of 25, 50 and 100 mg./kg., fever reduction of 12%, 19% and 53%, respectively, was observed. The $ED_{50}$ (50% reduction of fever) for the above compound was found to be 90 mg./kg.

Analgesia produced with the base of the present invention was established by a modification of the method described by Whittle (Brit. J. Pharm., 1964, vol. 22, page 246): mice are pre-treated with the test compound or a placebo by oral administration thereof. Twenty minutes later, the mice were injected intravenously with 100 mg./kg. of a 1% Evans Blue solution in isotonic saline followed in 10 minutes by an intraperitoneal injection of 0.4 ml. of 0.5% aqueous acetic acid. Writhing produced by the acid is counted for a period of 20 minutes. Analgesic effect is the percent inhibition of writhes calculated from the difference between the control group and the test group. Each group of test and control animals comprised 5 mice. At doses of 12.5, 25, 50 and 100 mg./kg., the writhing inhibition with the new compound was found to be 22%, 41%, 55% and 64%, respectively; the oral $ED_{50}$ in mice is 45 mg./kg.

While the above therapeutic effect was demonstrated by oral administration, it is to be understood that intraperitoneal and intramuscular administration is similarly effective. For ease of proper and convenient dispensing, free 2,3-dihydro-1H-pyridino-[2,3-b][1,4]-thiazin-2-one 4-oxide can easily be processed into tablets, wafers, syrups, pills or capsules for oral administration or clear aqueous solutions suitable for injections. Where a liquid formulation is desired, proper stabilizers or preservatives should be added to prevent premature decomposition or the liquid dosage form should be prepared only shortly before administration. However, the solid dosage forms are stable for extended shelf life.

I claim:
1. The process of treating a warm-blooded animal afflicted with edema, inflammation, pain or fever consisting essentially in administering to said animal a non-toxic but effective amount of 2,3-dihydro-1H-pyridino-[2,3-b][1,4]-thiazin-2-one 4-oxide.
2. The process of claim 1 wherein said non-toxic amount is between 2.5 and 100 mg./kg. and is administered orally.
3. The process of claim 2 wherein said amount is between 5 and 20 mg./kg.

References Cited

UNITED STATES PATENTS 3,546,220  12/1970  Stein et al. _____ 260—243

STANLEY J. FRIEDMAN, Primary Examiner